(12) United States Patent
Myhre et al.

(10) Patent No.: US 11,218,960 B2
(45) Date of Patent: *Jan. 4, 2022

(54) ENERGY-SAVING MECHANISMS IN A HETEROGENEOUS RADIO COMMUNICATION NETWORK

(71) Applicant: Telefonaktiebolaget L M Ericsson (publ), Stockholm (SE)

(72) Inventors: Elena Myhre, Järfälla (SE); Tarmo Kuningas, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 409 days.

This patent is subject to a terminal disclaimer.

(21) Appl. No.: 14/547,945

(22) Filed: Nov. 19, 2014

(65) Prior Publication Data

US 2015/0078235 A1    Mar. 19, 2015

Related U.S. Application Data

(63) Continuation of application No. 12/790,055, filed on May 28, 2010.

(Continued)

(51) Int. Cl.
*H04W 52/02* (2009.01)
*H04W 24/02* (2009.01)
(Continued)

(52) U.S. Cl.
CPC ....... *H04W 52/0206* (2013.01); *H04W 24/02* (2013.01); *H04B 7/2606* (2013.01);
(Continued)

(58) Field of Classification Search
None
See application file for complete search history.

(56) References Cited

U.S. PATENT DOCUMENTS 5,164,938 A * 11/1992 Jurkevich ............. H04J 3/1682
370/231
5,936,943 A   8/1999 Sakagami et al.
(Continued)

FOREIGN PATENT DOCUMENTS

CN        1981315 A    6/2007
CN      101207893 A    6/2008
(Continued)

OTHER PUBLICATIONS

Ericsson. "Considerations on energy saving solutions in heterogeneous networks." 3GPP TSG-RAN WG3 #65, R3-092006, Shenzhen, China, Aug. 24-28, 2009, pp. 1-2.

(Continued)

*Primary Examiner* — Christopher T Wyllie
(74) *Attorney, Agent, or Firm* — Coats & Bennett, PLLC

(57) ABSTRACT

There is provided support mechanisms for at least one adding and removing a cell from operation in a heterogeneous radio network having a first type of basic cell for providing basic radio coverage and a second type of cell associated to a basic cell as a capacity enhancing cell. A capacity enhancing cell is selectively switched on and off. When the capacity enhancing cell is shut down the cell does not exist over the air while cell configuration information is kept. When the capacity enhancing cell is switched on the cell becomes available again over the air interface. An indication of shut-down and a wake-up call message for switch-on of the capacity enhancing cell are communicated between a base station serving the capacity enhancing cell and a base station serving the basic cell. In this way energy savings can be supported without disrupting service availability.

43 Claims, 14 Drawing Sheets

Related U.S. Application Data

(60) Provisional application No. 61/234,704, filed on Aug. 18, 2009.

(51) Int. Cl.
*H04W 92/20* (2009.01)
*H04W 16/26* (2009.01)
*H04B 7/26* (2006.01)
*H04W 16/32* (2009.01)

(52) U.S. Cl.
CPC ............ *H04W 16/26* (2013.01); *H04W 16/32* (2013.01); *H04W 92/20* (2013.01); *Y02D 30/70* (2020.08)

(56) References Cited

U.S. PATENT DOCUMENTS

| | | | |
|---|---|---|---|
| 5,960,353 A | 9/1999 | Lee | |
| 6,405,048 B1 | 6/2002 | Haarsten | |
| 8,160,591 B2 | 4/2012 | Xu et al. | |
| 2002/0086679 A1* | 7/2002 | Li | H04W 16/06 455/453 |
| 2004/0162074 A1 | 8/2004 | Chen | |
| 2005/0201322 A1 | 9/2005 | Saito | |
| 2006/0187942 A1* | 8/2006 | Mizutani | H04L 47/808 370/401 |
| 2007/0016688 A1* | 1/2007 | Hester | H04L 67/32 709/238 |
| 2007/0147241 A1* | 6/2007 | Wang | H04L 47/125 370/230 |
| 2007/0155314 A1 | 7/2007 | Mohebbi | |
| 2007/0286370 A1* | 12/2007 | Kauppinen | H04L 29/06027 379/142.01 |
| 2008/0095054 A1* | 4/2008 | Morford | H04L 41/0896 370/231 |
| 2008/0151806 A1 | 6/2008 | Bereski et al. | |
| 2009/0028163 A1* | 1/2009 | Blatherwick | H04L 47/823 370/400 |
| 2009/0290565 A1* | 11/2009 | Mangetsu | H04W 40/00 370/338 |
| 2010/0002610 A1* | 1/2010 | Bowser | G06F 1/3209 370/311 |
| 2010/0008293 A1* | 1/2010 | Gupta | H04W 92/20 370/328 |
| 2010/0056184 A1* | 3/2010 | Vakil | H04W 52/0206 455/456.5 |
| 2010/0189075 A1 | 7/2010 | Iwamura et al. | |
| 2010/0234013 A1 | 9/2010 | Schmitt | |
| 2010/0238900 A1* | 9/2010 | Johansson | H04W 36/02 370/331 |
| 2011/0177824 A1* | 7/2011 | Hasegawa | H04W 4/20 455/450 |
| 2011/0300887 A1* | 12/2011 | Osterling | H04W 52/0206 455/507 |
| 2012/0004009 A1* | 1/2012 | Lindoff | H04W 52/0232 455/522 |
| 2012/0044824 A1* | 2/2012 | Osterling | H04W 52/0225 370/252 |
| 2012/0207078 A1* | 8/2012 | Hwang | H04W 80/02 370/315 |

FOREIGN PATENT DOCUMENTS

| | | | | |
|---|---|---|---|---|
| EP | 2056628 | * | 10/2007 | ........ H04W 52/0206 |
| EP | 2056628 A1 | | 5/2009 | |
| EP | 2187698 A1 | | 5/2010 | |
| GB | 2316578 | * | 2/1998 | ............... H04Q 7/36 |
| GB | 2316578 A | | 2/1998 | |
| JP | 2005260427 A | | 9/2005 | |
| JP | 2009182620 A | | 8/2009 | |
| WO | 2008051124 A1 | | 5/2008 | |
| WO | 2009017168 A1 | | 2/2009 | |
| WO | 2009022534 A1 | | 2/2009 | |
| WO | 2009068138 A1 | | 6/2009 | |
| WO | 2009099224 A1 | | 8/2009 | |

OTHER PUBLICATIONS

Ericsson. "RNL-based energy saving solution." Change Request, 3GPP TSG-RAN3 Meeting #66, R3-093104, Jeju, Korea, Nov. 9-13, 2009, pp. 1-27.

3rd Generation Partnership Project. "3rd Generation Partnership Project; Technical Specification Group Radio Access Network; Evolved Universal Terrestrial Radio Access Network (E-UTRAN); X2 application protocol (X2AP) (Release 8)." 3GPP TS 36.423, V8.6.0, Jun. 2009, Sophia Antipolis Valbonne, France, pp. 1-100.

3rd Generation Partnership Project. "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)." 3GPP TS 36.300, V8.9.0, Jun. 2009, Sophia Antipolis Valbonne, France, pp. 1-159.

\* cited by examiner

ENERGY-SAVING MECHANISMS IN A HETEROGENEOUS RADIO COMMUNICATION NETWORK

RELATED APPLICATIONS

This application claims priority to U.S. patent application Ser. No. 12/790,055 filed 28 May 2010, which claims priority to U.S. Provisional Patent Application 61/234,704 filed 18 Aug. 2009, both of which are incorporated herein by reference.

TECHNICAL FIELD

The invention generally relates to cellular radio communication networks, and more particularly to energy-saving mechanisms in a heterogeneous network having at least two different types of cells.

BACKGROUND

Energy costs account for as much as half of a mobile operator's operating expenses, so radio network solutions that improve energy efficiency are not only good for the environment, but also make commercial sense for operators and support sustainable, profitable business.

Energy saving can be achieved through a variety of solutions like optimal network design following Product Lifecycle Assessment, creating energy-efficient site solutions and with the introduction of innovative use of alternative energy sources to run the network.

Within the 3GPP arena, for example, no energy saving solutions were agreed upon during the Release 8 timeframe (neither for LTE nor for UMTS radio access) and in general little discussion has taken place so far.

Although energy saving as a slogan appeared in the agenda of 3GPP RAN working groups' meetings, no solutions have been brought forward so far.

On the other hand it has to be considered that in GSM there is the possibility to apply energy saving actions by switching on and off one or more 200 kHz carriers, as more than one 200 kHz carrier is typically deployed per cell, according to load in the cell, and similar solutions can be envisaged at carrier level for multi-carrier WCDMA and in LTE earliest from Release 10, where carrier aggregation exists. There is hence no energy saving support for LTE in earlier releases or for WCDMA without the multi carrier option.

SUMMARY

There is a general need for improvements in the field of energy saving for radio communication networks.

The invention relates to support mechanisms by which radio access networks, where different cell types are adopted, can, in a self-organized manner, add and/or remove cells from operation when needed in order to achieve energy savings, and without disrupting service availability.

According to a first aspect there is provided a method for at least one of adding and removing a cell from operation in a heterogeneous radio communication network having at least two different types of cells, including a first type of basic cell for providing basic radio coverage and a second type of cell associated to a basic cell as a capacity enhancing cell. The method comprises selectively switching the capacity enhancing cell on and off; when the capacity enhancing cell is shut down the cell does not exist over the air while cell configuration information is kept and when the capacity enhancing cell is switched on cell defining information is retransmitted and the cell becomes available again over the air interface. The method further comprises communicating an indication of shut-down and a wake-up call message for switch-on of the capacity enhancing cell between a base station serving the capacity enhancing cell and a base station serving the basic cell.

In this way energy savings can be achieved without disrupting service availability.

According to a second aspect there is provided a method of operating a base station serving a basic cell providing basic radio coverage. The basic cell has a neighbour cell relation to an associated capacity enhancing cell served by another base station. In the method, the base station serving the basic cell is receiving an indication that the associated capacity enhancing cell is shut down over the air for energy saving purposes, and keeping corresponding cell configuration information. The base station serving the basic cell is sending a wake-up call message to the base station serving the associated capacity enhancing cell when it is decided that the base station serving the basic cell needs the capacity enhancing cell to return operational.

This provides support for energy savings, while service availability can be maintained.

According to a third aspect there is provided a method of operating a base station serving a capacity enhancing cell. The capacity enhancing cell has a neighbour cell relation to an associated basic cell, providing basic radio coverage, served by another base station. In the method, the base station serving the capacity enhancing cell is shutting down the capacity enhancing cell over the air for energy saving purposes, while keeping cell configuration information, and sending an indication that the capacity enhancing cell is shut down for energy saving purposes to the base station serving the basic cell.

This provides energy savings, and the kept cell configuration information supports quick and easy reactivation of the cell when needed.

According to a fourth aspect there is provided a base station having a radio coverage unit configured to serve a basic cell providing basic radio coverage, and a neighbour cell relation unit configured to manage a neighbour cell relation between the basic cell and an associated capacity enhancing cell served by another base station. The base station further comprises a cell configuration information unit configured to receive an indication that the associated capacity enhancing cell is shut down over the air for energy saving purposes, and to keep corresponding cell configuration information. The base station also comprises a wake-up call unit configured to send a wake-up call message to a base station serving the associated capacity enhancing cell when it is decided that the base station serving the basic cell needs the capacity enhancing cell to return operational.

According to a fifth aspect there is provided a base station having a radio coverage unit configured to serve a capacity enhancing cell, and a neighbour cell relation unit configured to manage a neighbour cell relation between the capacity enhancing cell and an associated basic cell, providing basic radio coverage, served by another base station. The base station further comprises a shut-down unit configured to shut down the capacity enhancing cell over the air for energy saving purposes, and a cell configuration information unit configured to keep corresponding cell configuration information. The shut-down unit is configured to send an indication that the capacity enhancing cell is shut down for energy saving purposes to the base station serving the basic cell.

Other advantages offered by the invention will be appreciated when reading the below description of embodiments of the invention.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

As mentioned above, a basic idea is to add and/or remove cells from operation in a heterogeneous radio communication network when needed in order to achieve energy savings, and without disrupting service availability, for example by considering cell-load-related parameters such as information/statistics about the load conditions of the considered cell and/or load balancing actions.

In a heterogeneous network, there may be a first type of basic cell for providing basic radio coverage and a second type of cell associated to a basic cell as a capacity enhancing cell, i.e. a capacity booster.

Figure 1:
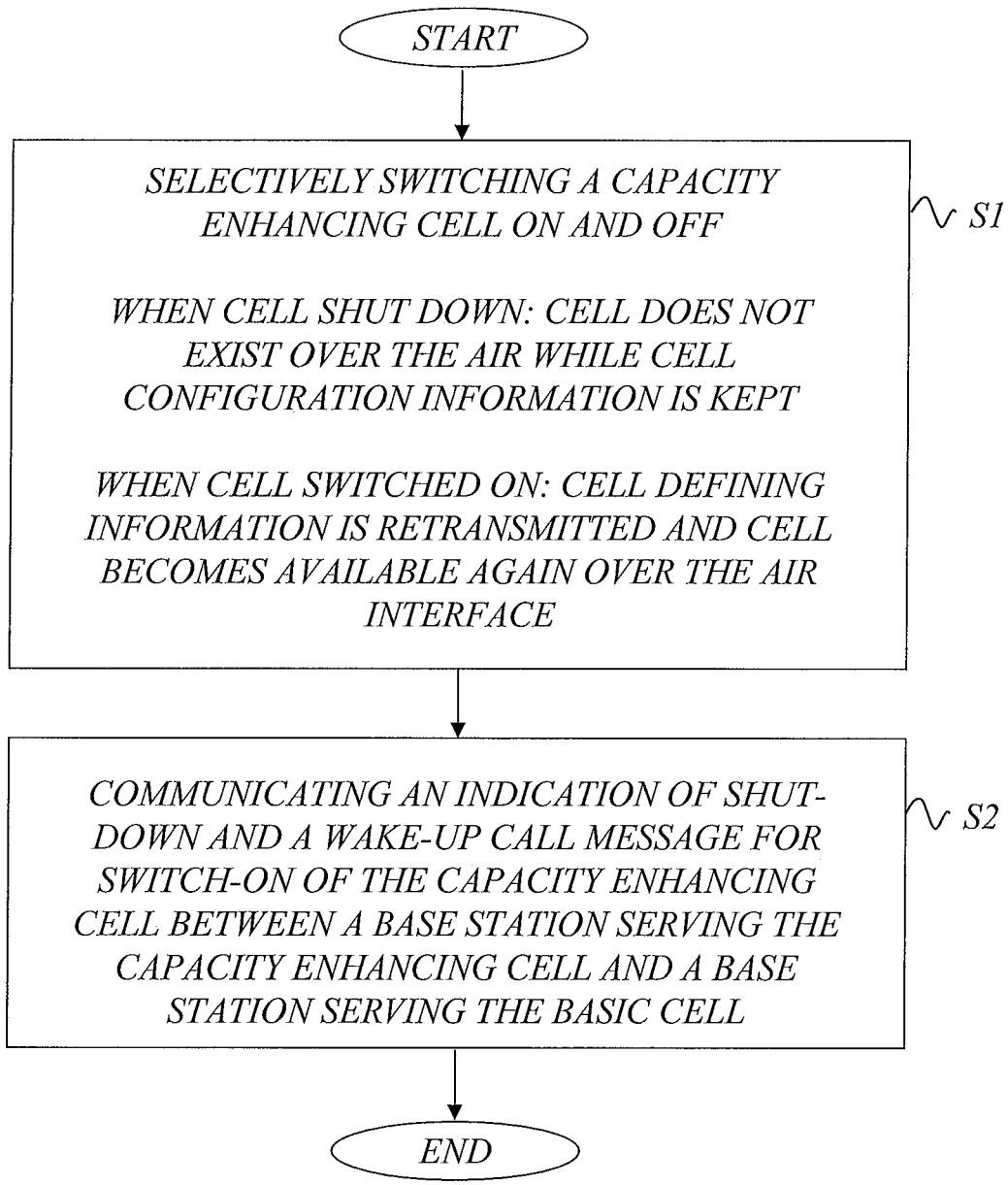
FIG. 1 is a schematic flow diagram of an example of a method for adding and/or removing a cell from operation in a heterogeneous radio communication network having at least two different types of cells.

FIG. 1 is a schematic flow diagram of an example of a method for at least one of adding and removing a cell from operation in a heterogeneous radio communication network having at least two different types of cells. The different types of cells include a first type of basic cell for providing basic radio coverage and a second type of cell associated to a basic cell as a capacity enhancing cell. Step S1 includes selectively switching the capacity enhancing cell on and off. When the capacity enhancing cell is shut down the cell does not exist over the air while cell configuration information is kept. When the capacity enhancing cell is switched on cell defining information is retransmitted and the cell becomes available again over the air interface. Step S2 includes communicating an indication of shut-down and a wake-up call message for switch-on of the capacity enhancing cell between a base station serving the capacity enhancing cell and a base station serving the basic cell. In this way energy savings can be achieved without disrupting service availability.

As will be exemplified later on, the communication between the base station serving the capacity enhancing cell and the base station serving the basic cell may for example be performed on the Radio Network Layer (RNL) in the X2 Application Protocol (X2AP), although other options also exist. For example, there are options allowing the base station serving the basic cell and the base station serving the associated capacity enhancing cell to be radio network elements of different radio access technologies.

Figure 2:
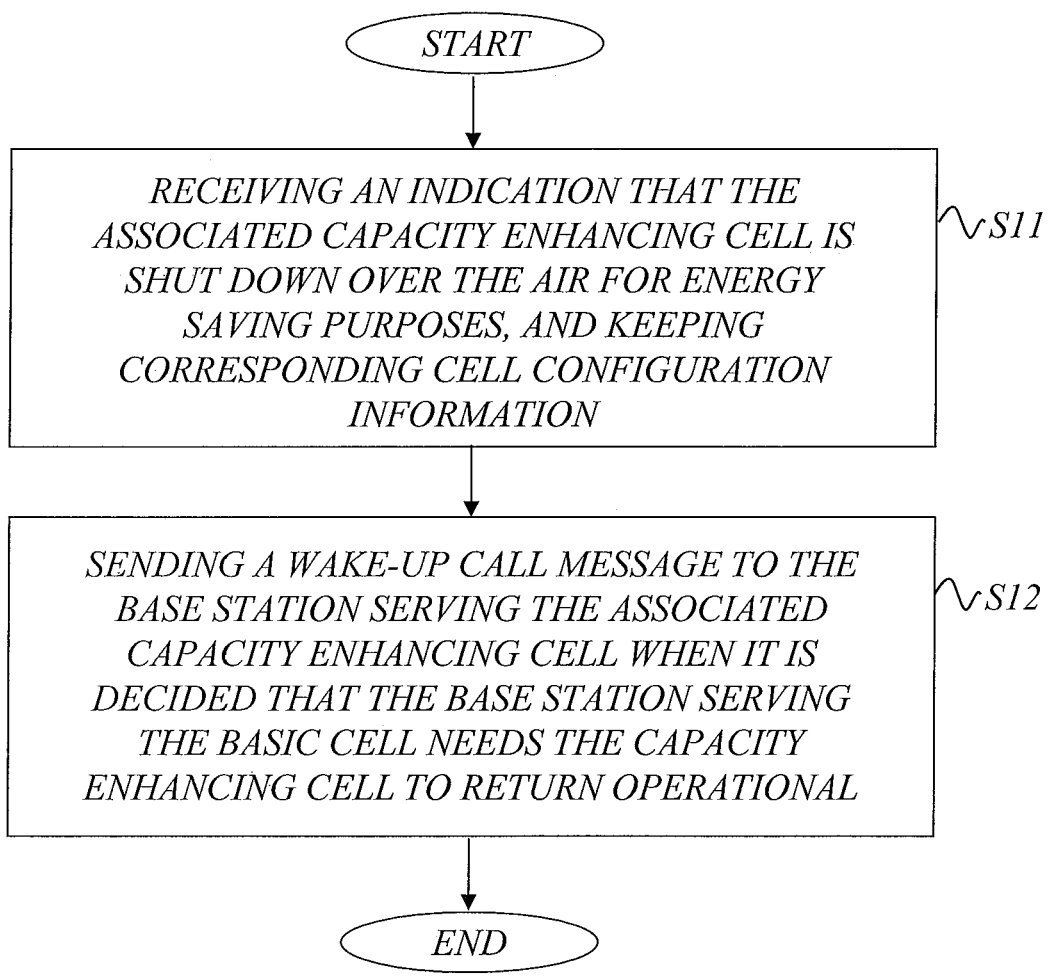
FIG. 2 is a schematic flow diagram of an example of a method for a base station serving a basic cell providing basic radio coverage.

With reference to FIG. 2, an example of a method for the base station serving the basic cell will be described. It is assumed that the basic cell has a neighbour cell relation to an associated capacity enhancing cell served by another base station. Step S11 includes receiving an indication that the associated capacity enhancing cell is shut down over the air for energy saving purposes, and keeping corresponding cell configuration information. Step S12 includes sending a wake-up call message to the base station serving the associated capacity enhancing cell when it is decided that the base station serving the basic cell needs the capacity enhancing cell to return operational. This provides support for energy savings, while service availability can be maintained.

In a particularly interesting implementation example, the steps S11 and S12 of receiving an indication and sending a wake-up call message are performed on the Radio Network Layer (RNL) in the X2AP protocol, as will be discussed later on.

For example, the base station serving the basic cell may indicate that it needs the capacity enhancing cell(s) to return operational via a wake-up call message in the X2AP protocol. The wake-up call message is preferably in the form of a Cell Activation Request.

For example, the shut-down indication may be received in the so-called eNB Configuration Update procedure of the X2AP protocol. Further, the reason for shut-down as an action due to energy-saving purposes may be indicated in the eNB Configuration Update procedure.

When the base station serving the basic cell receives the indication that the capacity enhancing cell is shut down for energy saving purposes, it keeps the cell configuration information related to the capacity enhancing cell. In this way, the base station of the basic cell can still "count on" the sleeping capacity enhancing cell, and send a wake-up call to the base station of the capacity enhancing cell when needed.

The RNL-based solution using the X2AP protocol is an efficient intra-RAT (Radio Access Technology) solution, especially for intra-LTE.

However, the invention is also effective for inter-RAT scenarios, where the base station serving the basic cell and the base station serving the associated capacity enhancing cell are radio network elements of different radio access technologies (RATs).

As will be discussed below, the base station serving the basic cell preferably makes a wake-up decision for activation of the capacity enhancing cell based on load-related parameters. For example, the wake-up decision for activation of the capacity-enhancing cell may be based on statistics on at least one of load in the basic cell and/or load balancing actions the basic cell triggers towards the capacity enhancing cell.

A base station (eNB) is configured for performing the method outlined above in connection with FIG. 2.

Figure 3:
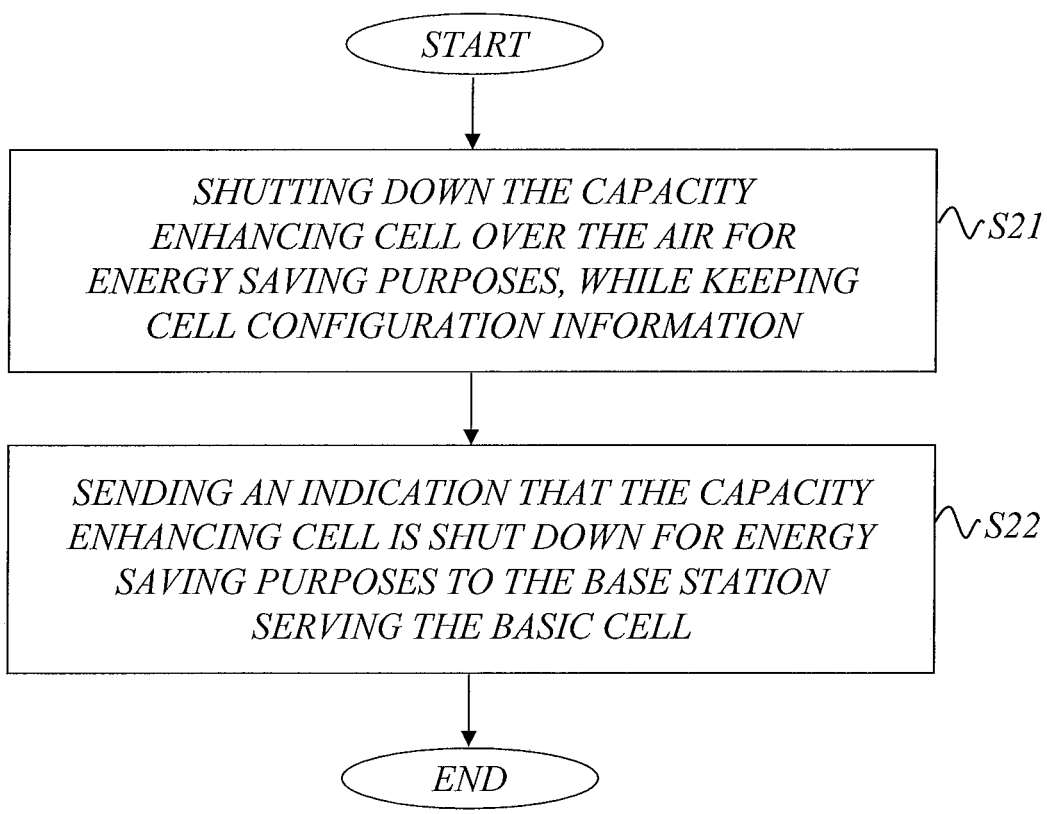
FIG. 3 is a schematic flow diagram of an example of method for a base station serving a capacity enhancing cell.

With reference to FIG. 3, an example of a method for the base station serving the capacity enhancing cell will be described. It is assumed that the capacity enhancing cell has a neighbour cell relation to an associated basic cell, providing basic radio coverage, served by another base station. Step S21 includes shutting down the capacity enhancing cell over the air for energy saving purposes, while keeping cell configuration information. Step S22 includes sending an indication that the capacity enhancing cell is shut down for energy saving purposes to the base station serving the basic cell. This provides energy savings, and the corresponding cell configuration information that is kept in the base station for the "sleeping" capacity enhancing cell supports quick and easy reactivation of the cell when needed.

In a particularly interesting implementation example, the step S22 of sending an indication is performed on the Radio Network Layer (RNL) in the X2AP protocol, as will be discussed later on.

For example, shut-down of the capacity enhancing cell may be indicated in the eNB Configuration Update procedure of the X2AP protocol. Further, the reason for shut-down as an action due to energy-saving purposes may be indicated in the eNB Configuration Update procedure.

Preferably, although not required, the step of shutting down the cell is self-triggered, and the base station serving the capacity enhancing cell can for example make a decision to shut down the capacity enhancing cell based on load in the capacity enhancing cell.

A base station (eNB) is configured for performing the method outlined above in connection with FIG. 3.

Figure 4:
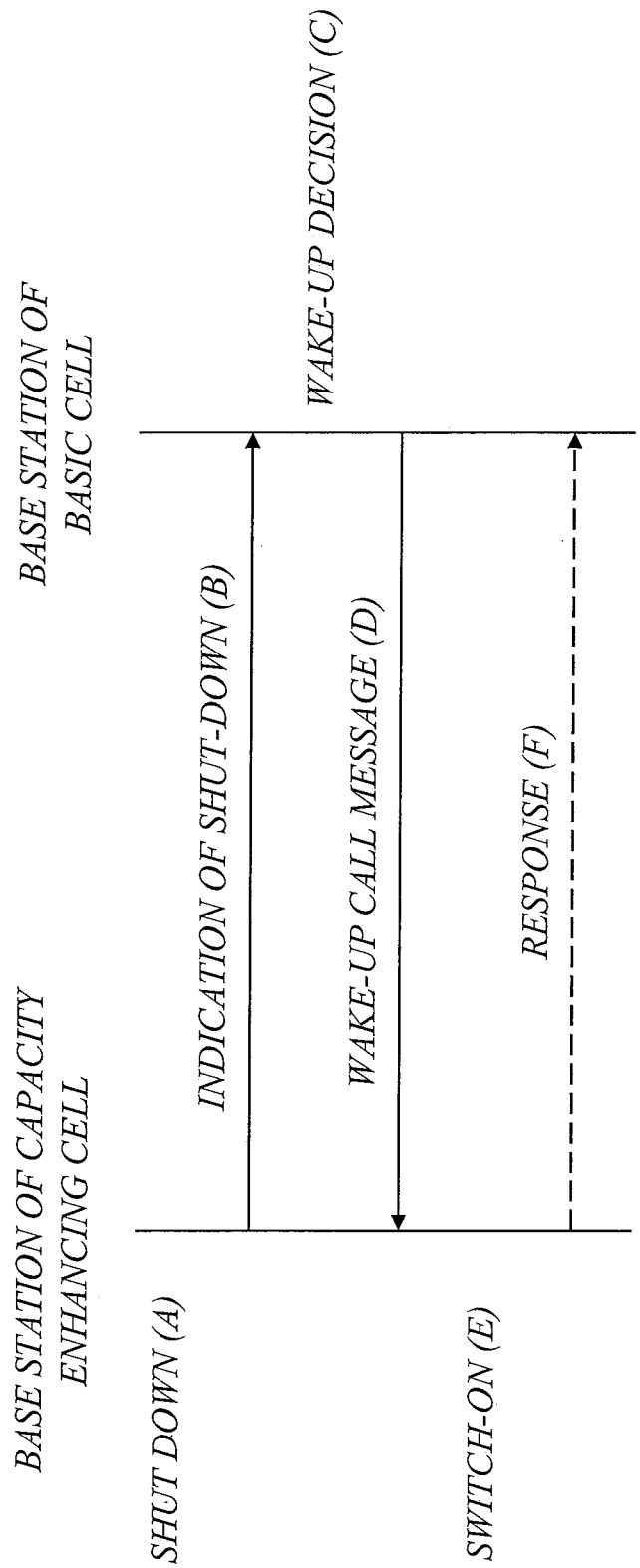
FIG. 4 is a schematic exemplary signalling and action diagram illustrating an example of actions and signalling between a base station of a capacity enhancing cell and a base station of a basic cell.

FIG. 4 is a schematic exemplary signalling and action diagram illustrating an example of actions and signalling between a base station of a capacity enhancing cell and a base station of a basic cell. When appropriate, the base station of the capacity enhancing cell performs a shut down (A) of the capacity enhancing cell, and sends an indication of shut-down (B) for energy saving purposes to the base station of the basic cell. When the capacity enhancing cell is subsequently needed again for capacity and/or load reasons, the base station of the basic cell takes a wake-up decision (C) and sends a corresponding wake-up call message (D) to the base station of the capacity enhancing cell. The base station of the capacity enhancing cell performs switch-on (E) of the capacity enhancing cell based on the wake-up call message. Optionally, the base station of the capacity enhancing cell can send a response (F) to the base station of the basic cell indicating that the switch-on of the capacity enhancing cell was successful, or alternatively that the switch-on failed.

In the following, the invention will be discussed with reference to further exemplary and non-limiting embodiments.

The capacity boosting cell can be selectively switched on and off based on consideration of load-related parameters including for example load conditions and/or load balancing information such as collected statistics on load levels and/or load balancing actions. General service availability is guaranteed by the basic coverage-providing layer and not impacted by the capacity regulation/energy saving actions.

A basic characterization of the 'types' of cells involved is that a first type of cell is for providing basic radio coverage, and can not be shut down without creating a coverage hole, i.e. without service disruption, while a second type of cell is associated to the basic cell (via a "neighbour" cell relation) as a capacity enhancing cell, i.e. a capacity booster.

Accordingly, there is normally a basic cell that should generally not be switched off, and a capacity boosting cell that can be switched on and off based on consideration of the overall load conditions in the cell(s) and/or information on load balancing such as for example load balancing actions/requests/triggers going to the capacity booster. The capacity enhancing cell may be switched off in case of low load while the basic cell continues to provide basic coverage. Based on information about the load conditions of the basic cell and/or load balancing actions, the basic cell may wake up the associated capacity enhancing cell(s) to enhance the capacity of the network. For example, if a base station (e.g. eNB) controlling a cell providing basic coverage detects a surge in load then the base station (e.g. eNB) may wake up the 'neighbour' to enhance the capacity of the network. More advanced control mechanisms may take the wake-up decision based on statistics on load conditions and/or load balancing actions so that the capacity booster will be activated at suitable times (such as peak traffic hours), to start off-loading the basic coverage providing cell. For example, the cell providing basic coverage counts how many users/how much traffic it serves at the point when it starts to trigger load balancing handover requests towards the capacity boosting cell, or it remembers the load level it has in average when it starts to trigger such handover requests. These indicators (load level and/or number of served users/traffic) can represent the threshold when the capacity boosting cell needs to be switched on in dynamic/real-time operation. In this example, an important aspect is thus the load-related statistics used together with at least one corresponding dynamic parameter value for triggering a basic cell to request a capacity-boosting cell to wake up. For example, a dynamic load-related parameter value can be compared against a statistically derived load-related threshold value as a basis to make the wake-up decision.

The invention has the advantage to be non-service impacting by making use of the knowledge that some cells are there for basic coverage and some are there for increasing capacity and each cell knows what its 'neighbour' is there for.

The present invention does not focus on using mobility triggers as a criterion to perform shut down and switch on, but rather relies on cell-load-related parameters and information/statistics on load balancing actions and/or monitored load conditions. For example, the cell may be woken up when it is judged 'statistically' that it needs to be put in operation and not just because user equipment may need it for handover. Basically, the invention is network-controlled and the controlled cell activation/deactivation is generally service-independent in the sense that the decision to shut down or switch on is not dependent on the needs or bandwidth requirements of single users. Rather the invention preferably considers information and/or statistics about the overall load conditions (such as load levels) in the basic coverage cell and/or information/statistics about the load balancing situation.

For example, the basic coverage cell may be a 'macro' cell, and the capacity enhancing cell may be a 'micro' cell. The macro and the micro cells may (and do) cover at least partially overlapping areas, but they are independent cells (in terms of cell ids, etc.). In particular, an exemplary characteristic of the n-cell relation between the micro and the macro is that their areas partially overlap, but the antennas are not co-located. Typically, a micro cell would play the hot spot role and be defined as neighbour to a macro under it, so that for example fast passing UEs can be kept in the macro layer, while static ones (in the location of the hot spot) can perform HO to the micro cell (and be taken 'away' from the basic layer).

In an illustrative and non-limiting example, the basic cell is a macro cell and the capacity booster is a micro cell (as the coverage area size would make sense for this purpose). However, any heterogeneous 'pairing' with the characteristic above would do for this purpose. The basic cell and the capacity enhancing cell preferably represent different types of cells in a heterogeneous radio communication network.

In the particular example of a hierarchical cell structure (HCS), such as a macro-micro architecture, having two or more layers, there will be a distinction between different layers, and the idea is to incorporate the inventive mechanisms for controlled shut-down and/or switch-on of cells into the HCS concept. An exemplary deployment scenario thus involves different cell types (i.e. macro, micro, pico, etc.) in a hierarchical cell structure (HCS). The concept of HCS as such is prior art and it is described for LTE in [2].

In this particular scenario, it is assumed that cells on one or more of the lower HCS layers provide the basic coverage, while cells on one or more of the higher HCS layers add further capacity to the network. In other words, a basic cell is normally a cell on a lower HCS layer and a capacity enhancing cell is a cell on a higher HCS layer.

In the exemplary case of an LTE network, the eNB-s with neighbour cells in an area may have an X2 association.

It is also assumed here that the cell providing basic coverage, e.g. macro cell, is aware that said neighbour is characterized as capacity enhancing cell, e.g. a micro cell, Hence the cell providing basic coverage and the cell enhancing capacity are on a different HCS layer.

Figure 5:
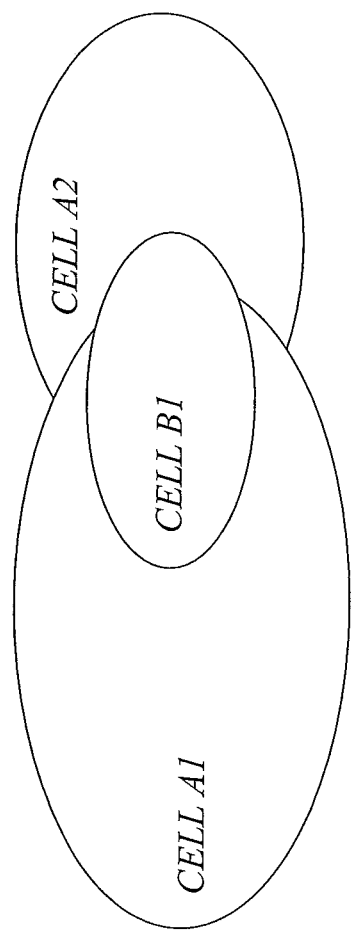
FIG. 5 is a schematic diagram illustrating an example of cells of different hierarchy levels.

The described network deployment is depicted in FIG. 5 where cells A1 and A2 provide basic coverage while cell B1 enhances the capacity in a given area.

Illustrative and non-limiting examples of energy saving mechanisms:

Self-Triggered Shut Down

In order to achieve energy saving the cell(s) adopted as capacity booster is monitoring the traffic load and is able to switch off when traffic drops below a certain threshold and stays below the threshold for certain time.

The entity that does the evaluation for shut down may be located in the eNB but also in some other node, e.g. Domain Manager or Network Manager.

Neighbour-Induced Switch-on

During operation, the traffic load statistics is collected in cells providing basic coverage, for example:
load in the cell providing basic coverage; and/or
load balancing action cell providing basic coverage triggers towards the capacity booster.

The collection of statistics enables the understanding of the point when it is most appropriate to start offloading, i.e. the point when to request the capacity booster cell to switch itself on. In other words, the collected information/statistics is analyzed to identify a switch-on threshold (in terms of served users/traffic and/or load level, as previously described) in order to take an appropriate decision for controlled activation of the capacity enhancing cell.

Switching on generally means that the power amplifier and energy consuming components go on, the cell defining info is retransmitted and the cell becomes available again over the air interface. When a cell is shut down, the cell does not exist over the air (the corresponding eNB is still on, so cell configuration info can be kept).

The entity that does the evaluation for switch-on may be located in the eNB but also in some other node, e.g. Domain Manager or Network Manager.

With respect to the collection of statistics, this may for example be in terms of how many triggers towards the capacity booster that were performed (a peg counter or something like that) or directly in terms of load (load is defined in X2AP by different entities already for the purpose of the load balancing actions). Examples of triggers could be load balancing related handover requests and/or rejections for UEs in RRC connected mode or cell reselection parameter settings, e.g. priority and signal strength, for RRC idle mode UEs. A threshold is defined (this would preferably be an operator-configurable parameter) as well as a hysteresis period (may also be configurable), so that the operator can tune the behaviour of the 'basic cell-booster cell' pair according to other aspects of the network at that location.

In other words, the capacity enhancing cell can be selectively switched on and off, and when the capacity enhancing cell is shut down, also referred to as sleeping, the cell does not exist over the air although cell configuration information is kept and when the capacity enhancing cell is switched on cell defining information is retransmitted and the cell becomes available again over the air interface. There is also support for communication related to shut-down and switch-on of the capacity enhancing cell, including e.g. an indication of shut-down and a wake-up call message for switch-on, between a base station (eNB) serving the basic cell and a base station (eNB) serving the capacity enhancing cell, as will be exemplified below.

Communication Between Basic Cell and Sleeping Capacity Enhancing Cell

The communication between the basic coverage providing cell and the sleeping capacity enhancing cell may be realized in a number of different ways, such as for example:
TNL realization: SCTP Init;
RNL realization: new X2AP message, named for example 'Cell Activation Request', as alternative, eNB owning basic cell starts sending load balancing requests (requests to offload itself) towards sleeping cell;
O&M realization: active eNB sends request to wake up to Domain Manager or Network Manager via management interfaces and Domain Manager/NM relays the request to the eNB owning the sleeping cell.

This will be explained in greater detail below.

TNL-Based Realization

If the cells controlled by an eNB on the higher HCS layer, e.g. micro cells, that are neighbours to the lower HCS layer cell, e.g. macro cell, are all meant for capacity increase, and there is an X2 association between the corresponding eNB-s, then the mechanisms described above can be realized without impacting the signaling protocols.

In this case in fact, shutting down of the capacity boosting cell/cells by the eNB controlling them becomes visible/known to the eNB controlling cells that provide basic coverage/capacity by two means:
The measurement reports from the UEs do not contain the cells dedicated for capacity enhancement; and The X2 association between the corresponding eNB-s has been released.

Once the eNB that controls cell providing basic coverage/capacity detects load condition that motivates the setup of capacity boosting cell(s), the eNB that controls the cell providing basic coverage/capacity could initiate the establishment of SCTP\X2 association which the eNB controlling capacity enhancing cells is able to interpret as a request to 'wake up'. Upon reception of the 'wake up' indication, the eNB controlling the capacity enhancing cells would set up respective cells and complete the establishment of respective SCTP\X2 association.

RNL-Based Realization

The realization of the energy saving mechanism described above can be also done without the restrictions described in the previous sub clause by modification of the current 3GPP standard (in particular [1] is impacted).

The so-called X2AP protocol provides a number of functions such as mobility management, load management, setting up the X2 interface, resetting the X2 interface, the eNB configuration update and so forth.

Figure 6:
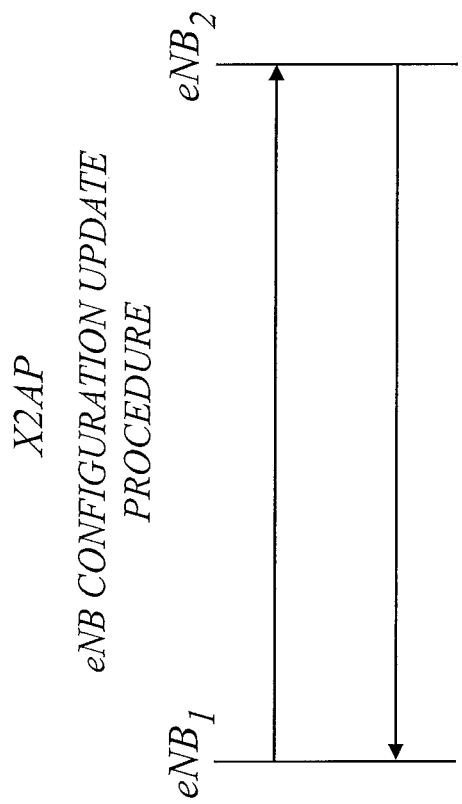
FIG. 6 is a schematic diagram illustrating the eNB configuration update procedure of the X2AP protocol.

In particular, the eNB configuration update procedure is designed for updating application level configuration data needed for two eNBs to interoperate correctly over the X2 interface. With reference to FIG. 6, an $eNB_1$ initiates the procedure by sending an eNB configuration update message to a peer $eNB_2$ including an appropriate set of updated configuration data that it has just taken into operational use. Upon reception of the eNB configuration update message from $eNB_1$, the $eNB_2$ shall update the information for $eNB_1$ with respect to data such as Served Cell information.

Considering that:
  On the X2 interface there is currently no 'interface shut-down' mechanism at the RNL layer (X2AP);
  In X2AP a procedure exists, which is named 'eNB Configuration Update' that is used by the eNB to indicate to its neighbour eNB which cells it serves and the configuration of the cells and can be sent to remove cells from operation, but has the restriction that at least one cell must be included, i.e. it cannot be 'as is' used for a total shut-down;
To Enable the Shut Down:
  The X2AP eNB Configuration Update procedure is modified to include the possibility to indicate that zero cells are operational (how to code this in the protocol can be solved in many different ways).

The possibility of indicating (with a new cause value or similar) the reason for the shut down as 'Action due to Energy Saving purposes' is also introduced in the eNB Configuration Update procedure.

To Enable the Switch-on:
  A new 'wake up call' message is introduced in the X2AP protocol, for example 'Cell Activation Request', so that the eNB controlling the cells that provide basic coverage/capacity can indicate it needs the capacity enhancing cell(s) to return operational.

An implicit way to realize this without a new message would be to reuse the already defined X2AP load balancing procedures and have the macro side simply start triggering load balancing actions towards the 'sleeping' cells/node.

In other words, the eNB Configuration Update procedure is enhanced to include an indication that a certain cell (a capacity enhancing cell) has been shut down or deactivated, and a new procedure/message is introduced in the X2AP protocol to indicate to a neighbouring eNB the need for a certain cell (a capacity enhancing cell) to be activated.

The cell configuration information corresponding to a deactivated capacity enhancing cell is still valid, preferably with the addition of an indication that the cell is deactivated or "sleeping".

The indication (also called a Deactivation Indication) that the cell is shut-down is for example included in a new information entity (IE) in the eNB Configuration Update procedure. By way of example, such a new Deactivation Indication IE may be contained in the existing Served Cells To Modify IE in the eNB Configuration Update procedure. Such a new IE makes it possible to maintain or keep the cell configuration data while the cell is sleeping.

In the prior art with respect to the 3GPP standard, the Served Cells To Delete IE is the standard way of removing a cell and used to delete the cell configuration information/data. This means that in the prior 3GPP standard there is no possibility for making any wake-up call since the cell is gone. Adding a new cell therefore has to be done from scratch by using the standard Served Cells To Add IE.

O&M-Based Realization

It is also possible to have the shut down and switch-on actions relayed via the O&M system.

In practice, to send a shut down indication, the eNB controlling the capacity enhancing cell(s):
  Shuts down the respective cells and hence the measurement reports from the UEs stop reporting the capacity enhancing cells; and
  Communicates energy saving shut down decision to the Domain/Network Manager, which then relays the indication to the eNB controlling the cells that provide basic coverage/capacity.

When the eNB controlling the cell that provides basic coverage/capacity detects the criteria the capacity boosting cells should be operational, it sends the respective request to Domain/Network Manager, which then relays the indication to the eNB controlling the capacity enhancing cell(s).

It should be noted that O&M based realization is not limited to intra-LTE operation but could also be used between radio network elements of different radio access technologies, for example GSM, UMTS or CDMA2000.

Exemplary advantages:
  General Service Availability is not Compromised while Energy Consumption in the System is reduced;
  The energy saving actions are self-organized, as eNB may collect statistics while in operation and are able to react to collected data by themselves;
  The method can be realized with or without standard modifications and with or without involvement of the O&M, i.e. the same concept can be applied in a flexible way.
  The invention provides a way to reduce energy consumption in cellular radio communication network such as LTE radio access network while avoiding service impacts.

Figure 7:
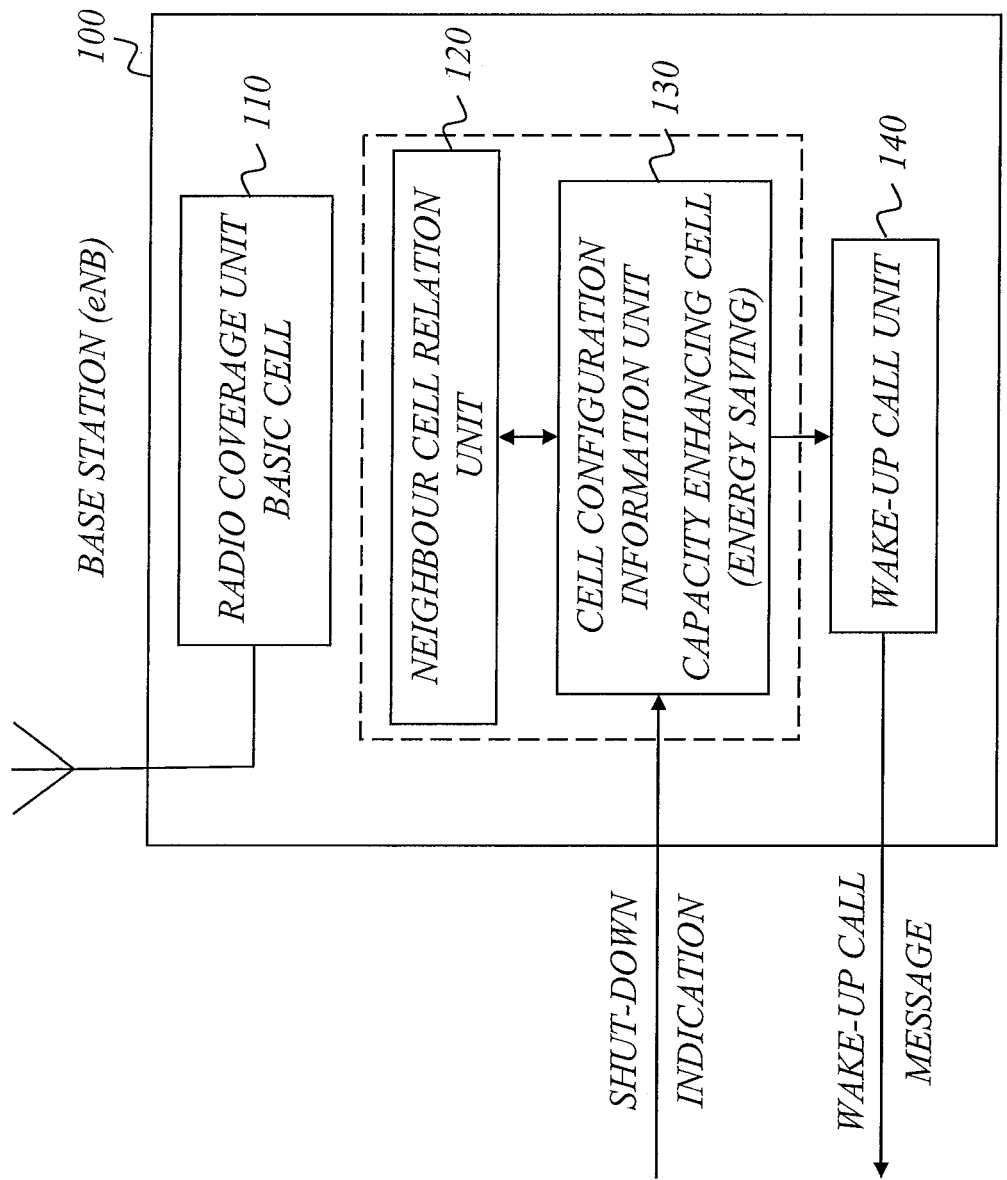
FIG. 7 is a schematic block diagram illustrating an example of base station serving a basic cell.

FIG. 7 is a schematic block diagram illustrating an example of base station serving a basic cell. The base station 100 includes a radio coverage unit 110, a neighbour cell relation unit 120, a cell configuration information unit 130, and a wake-up call unit 140. The radio coverage unit 110 is configured to serve a basic cell providing basic radio coverage and is connected to the antenna(s). The neighbour cell relation unit 120 is configured to manage neighbour cell relation(s) including a neighbour cell relation between the basic cell and an associated capacity enhancing cell served by another base station. The cell configuration information unit 130 is configured to receive an indication (shut-down indication) that the associated capacity enhancing cell is shut down over the air for energy saving purposes, and to keep corresponding cell configuration information related to the capacity enhancing cell. The wake-up call unit 140 is configured to send a wake-up call message to a base station serving the associated capacity enhancing cell when it is decided that the base station 100 serving the basic cell needs the capacity enhancing cell to return operational.

The base station 100 can for example make the wake-up decision for activation of the capacity enhancing cell based on load-related parameters, as previously discussed.

The neighbour cell relation unit 120 and the cell configuration information unit 130 are normally closely associated, and they may even be integrated as indicated by the dashed box in FIG. 7. It should be understood that the cell configuration information unit 130 stores cell configuration information related to a capacity enhancing neighbour cell.

Figure 8:
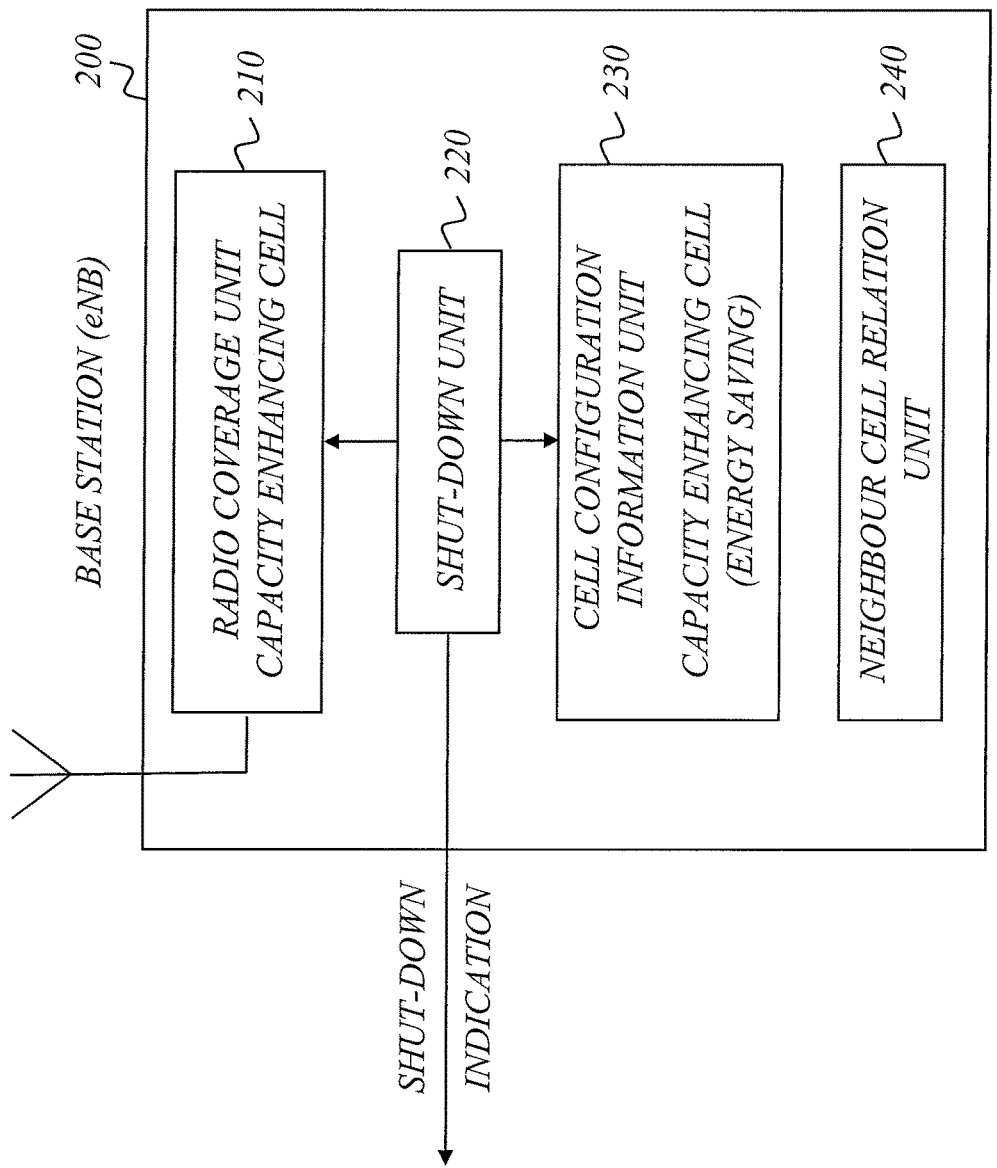
FIG. 8 is a schematic block diagram illustrating an example of base station serving a capacity enhancing cell.

FIG. 8 is a schematic block diagram illustrating an example of base station serving a capacity enhancing cell. The base station 200 includes a radio coverage unit 210, a shut-down unit 220, a cell configuration information unit 230, and a neighbour cell relation unit 240. The radio coverage unit 210 is configured to serve a capacity enhancing cell and is connected to the antenna(s). The shut-down unit 220 is configured to shut down the capacity enhancing cell over the air for energy saving purposes, and the cell configuration information unit 230 is configured to keep corresponding cell configuration information of the capacity enhancing cell. The shut-down unit 220 is also configured to send an indication that the capacity enhancing cell is shut down for energy saving purposes to another base station serving an associated basic cell providing basic radio coverage. The neighbour cell relation unit 240 is configured to manage neighbour cell relation(s) including the neighbour cell relation between the capacity enhancing cell and the associated basic cell.

It should be understood that the cell configuration information unit 230 stores cell configuration information related to the capacity enhancing cell served by the base station 200 itself. The neighbour cell relation unit 240 normally handles cell configuration information of neighbour cell(s) such as the basic neighbour cell.

Figure 9:
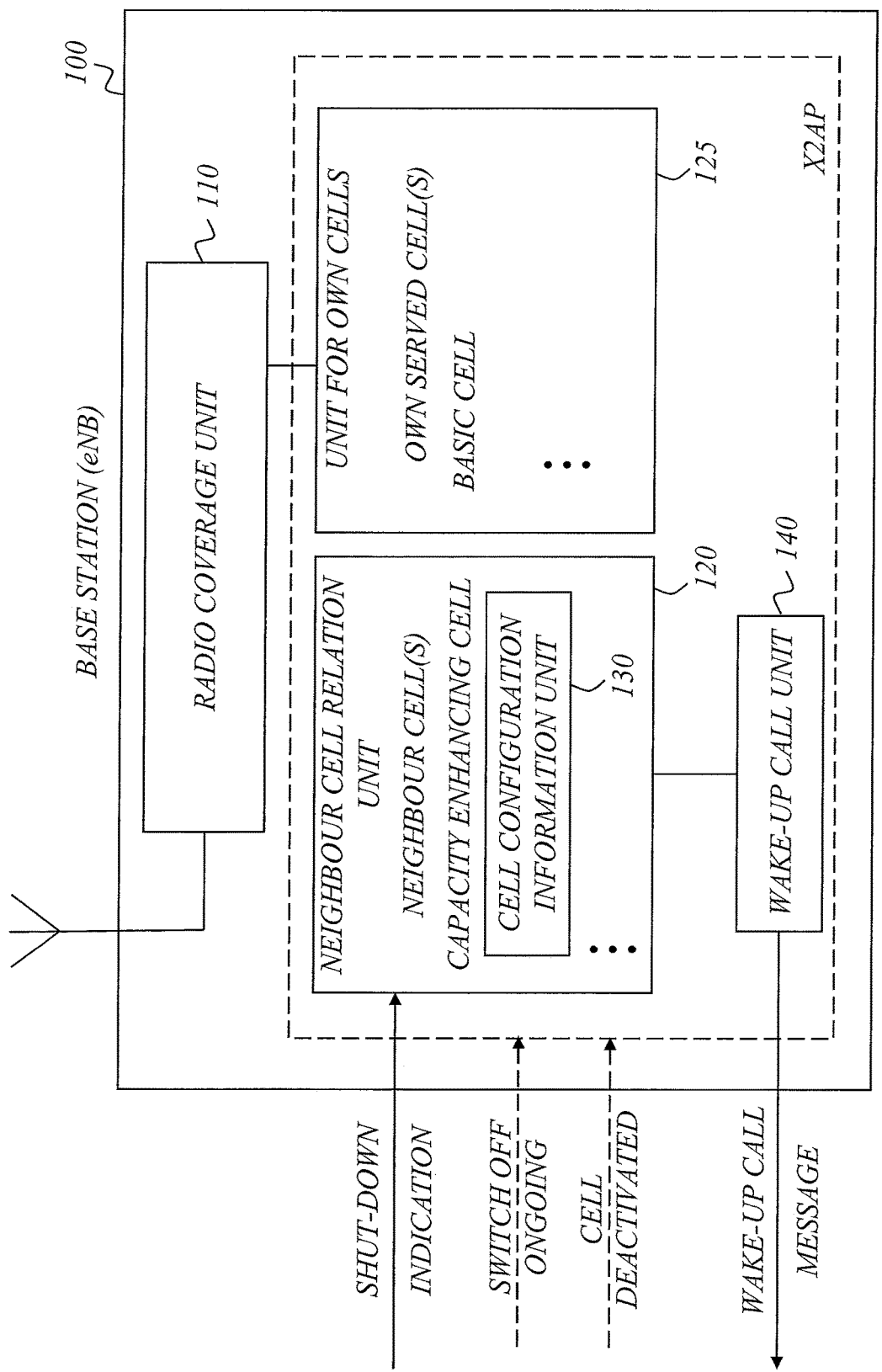
FIG. 9 is a schematic block diagram illustrating another example of base station serving a basic cell.

FIG. 9 is a schematic block diagram illustrating another example of base station serving a basic cell. In similarity to the block diagram of FIG. 7, the base station 100 shown in FIG. 9 also includes a radio coverage unit 110, a neighbour cell relation unit 120, a cell configuration information unit 130, and a wake-up call unit 140.

The neighbour cell relation unit 120 handles the relation(s) to neighbour cell(s) such as the capacity enhancing cell. In this example, the neighbour cell relation unit 120 includes the cell configuration information unit 130, which in turn stores cell configuration information related to at least the capacity enhancing cell. The base station 100 also includes a unit 125 for own cells. In this unit 125, cell configuration information related to the base station's own served cell(s) including the basic cell can be stored.

In the particular example of FIG. 9, the base station operates under the X2AP protocol. In particular, the cell configuration information exchange between different eNBs is performed under the X2AP protocol. The base station 100 of FIG. 9 is also configured to receive the shut-down indication and to send the wake-up call message on the Radio Network Layer (RNL) in the X2AP protocol.

Preferably, the wake-up call unit 140 is configured to indicate that it needs the capacity enhancing cell(s) to return operational via the wake-up call message in the X2AP protocol. The wake-up call message is preferably in the form of a Cell Activation Request.

The cell configuration information unit 130 stores the indication that the capacity enhancing cell has been shut down for energy saving purposes, preferably together with the cell configuration information related to the capacity enhancing cell, indicating that the capacity enhancing cell is temporarily deactivated or sleeping.

For example, the cell configuration information unit 130 may be configured to receive the shut-down indication in the eNB Configuration Update procedure of the X2AP protocol. Further, the base station may be configured to receive an indication of the reason for shut-down as an action due to energy-saving purposes in the eNB Configuration Update procedure.

Figure 10:
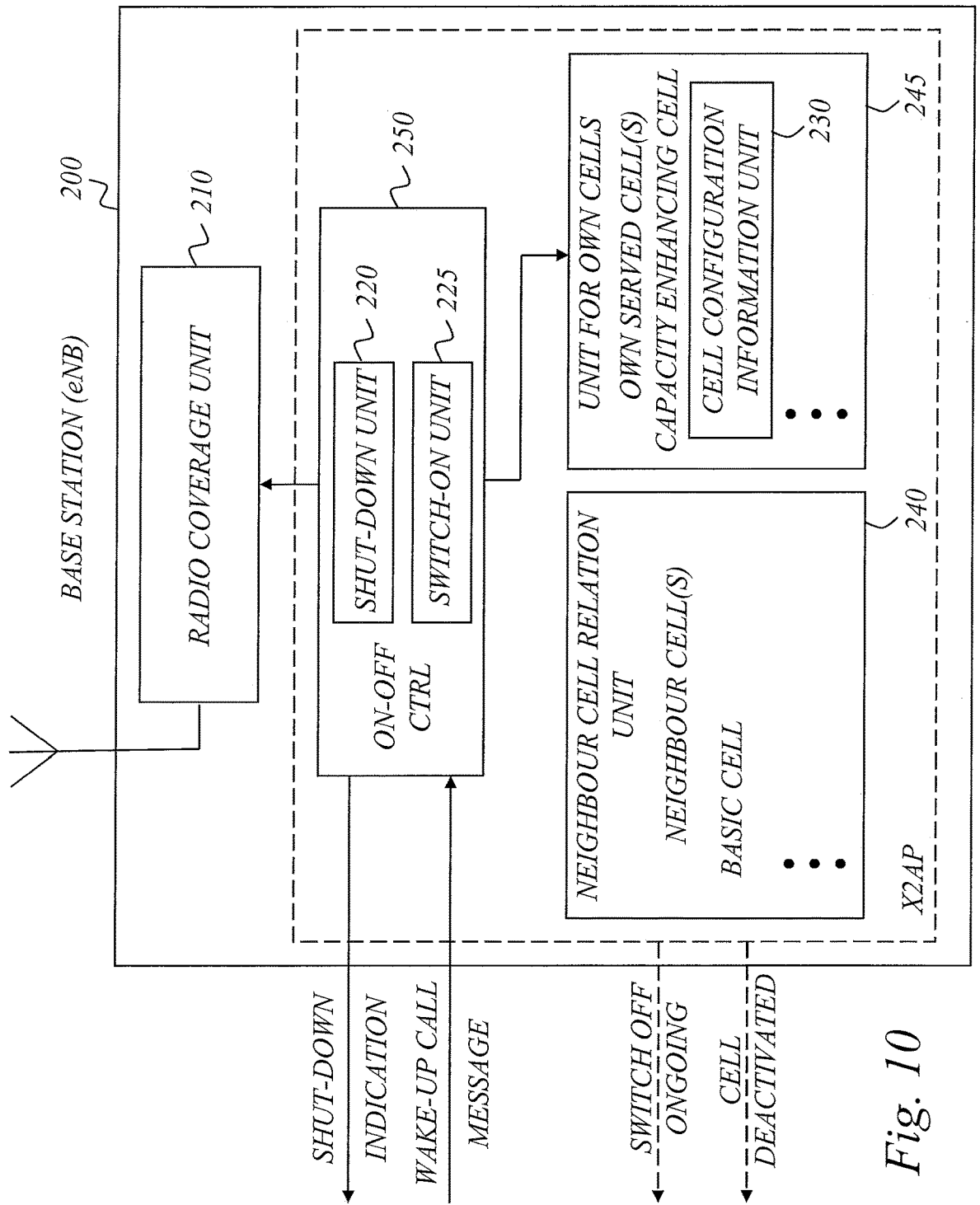
FIG. 10 is a schematic block diagram illustrating another example of base station serving a capacity enhancing cell.

FIG. 10 is a schematic block diagram illustrating another example of base station serving a capacity enhancing cell. In similarity to the block diagram of FIG. 8, the base station 200 shown in FIG. 10 also includes a radio coverage unit 210, a shut-down unit 220, a cell configuration information unit 230, and a neighbour cell relation unit 240.

The base station of FIG. 10 also includes a unit 245 for own cells. In this unit 245, cell configuration information related to the base station's own served cell(s) including the capacity enhancing cell can be stored. In this example, the unit 245 for own cells includes the cell configuration information unit 230 for storing cell configuration information of the own capacity enhancing cell. The neighbour cell relation unit 240 handles the relation(s) to neighbour cell(s) such as the basic cell.

The base station 200 of FIG. 10 also includes a switch-on unit 225 for enabling switch-on of own served cell(s) including the capacity enhancing cell. The shut-down unit 220 and the switch-on unit 225 may be implemented in an overall on-off control unit 250, if desired.

In the particular example of FIG. 10, the base station operates under the X2AP protocol. In particular, the cell configuration information exchange between different eNBs is performed under the X2AP protocol.

The shut-down unit 220 is configured to selectively shut down the capacity enhancing cell over the air for energy saving purposes, and the cell configuration information unit 230 is configured to keep corresponding cell configuration information of the capacity enhancing cell also after shut-down. Preferably, the indication that the capacity enhancing cell has been shut down for energy saving purposes is stored together with the cell configuration information related to the capacity enhancing cell, indicating that the capacity enhancing cell is temporarily deactivated or sleeping.

For example, the shut-down unit 220 may be configured to make a decision to shut down the capacity enhancing cell based on load in the capacity enhancing cell.

In this example, the shut-down unit 220 is configured to send the shut-down indication on the Radio Network Layer (RNL) in the X2AP protocol.

For example, the shut-down unit 220 may be configured to indicate shut-down of the capacity enhancing cell in the eNB Configuration Update procedure of the X2AP protocol. Further, the shut-down unit 220 may be configured to indicate the reason for shut-down as an action due to energy-saving purposes in the eNB Configuration Update procedure.

The switch-on unit 225 is preferably configured to receive the wake-up call message from the base station serving the associated basic cell requesting the capacity enhancing cell to return operational, and to switch the capacity enhancing cell on based on the wake-up call message. In connection with the switch-on, the cell configuration information in the cell configuration information unit 230 regarding the capacity enhancing cell is updated to indicate that the cell is no longer sleeping.

Figure 11:
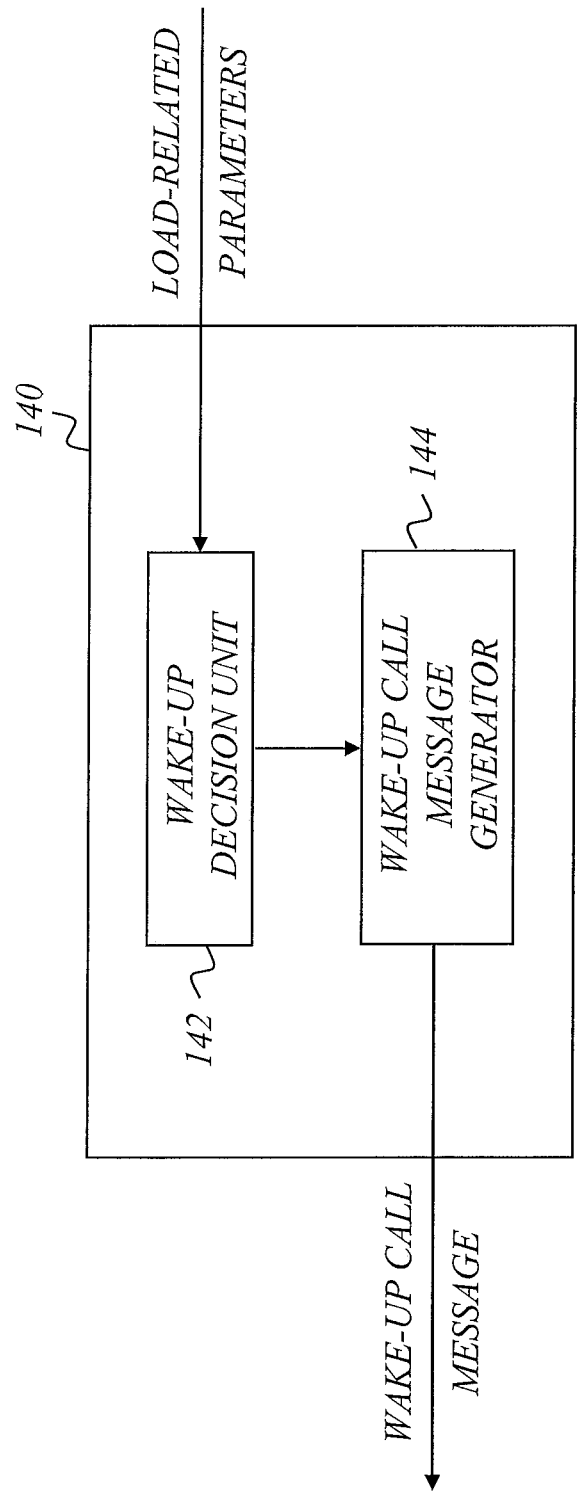
FIG. 11 is a schematic block diagram illustrating an example of a wake-up call unit.

FIG. 11 is a schematic block diagram illustrating an example of a wake-up call unit. The exemplary wake-up call unit 140 shown in FIG. 11 includes a wake-up decision unit 142 and a wake-up call message generator 144. The wake-up decision unit 142 is preferably configured to make a wake-up decision for activation of the capacity-enhancing cell based on load-related parameters. For example, the load-related parameters may include statistics on load in the basic cell and/or load balancing actions the basic cell triggers towards the capacity enhancing cell. Once a wake-up decision for activation of the capacity enhancing cell has been made, a corresponding wake-up call message is generated by the wake-up call message generator 144 and sent to the base station handling the capacity enhancing cell.

Preferably, the X2AP protocol is further enhanced by adding a new information entity (IE) and/or cause value to indicate that the base station (eNB) is moving UE(s) to another cell due to the current serving cell being (on the way to be) switched off, so that neighbouring base stations (eNBs) have the chance of not moving UE(s) back immediately. The IE and/or cause value is for example called Switch Off Ongoing, and the reason for the action is an ongoing switch off. In this way, it can be indicated that the concerned cell will be switched off once the cell has been off-loaded and will subsequently not be available for some time. This helps the receiving eNB that takes over UE(s) in taking subsequent actions, e.g. selecting proper target cell(s) for subsequent handovers. In other words, the cause value indicates that handover is performed from a cell that is on the way to be switched off It is assumed that a capacity enhancing cell is switched off for energy saving purposes, especially when the load conditions are suitable for such a switch off. Before completely switching the cell off, the capacity enhancing cell is first off-loaded by handing over UE(s) to one or more neighbouring cells such as a basic cell.

In this scenario, the base station serving the basic cell thus receives an indication that handover of UE(s) is performed from a capacity enhancing cell because the capacity enhancing cell is going to be switched off. Similarly, the base station serving the capacity enhancing cell sends such an indication to the base station serving the basic cell.

Alternatively, a new IE and/or cause value is introduced to indicate handover failure because the cell is off. The IE and/or cause value is for example called Cell Deactivated.

In this scenario, the base station serving the basic cell thus receives an indication that handover of UE(s) to a capacity enhancing cell has failed because the capacity enhancing cell is off. Similarly, the base station serving the capacity enhancing cell sends such an indication to the base station serving the basic cell.

With reference to the block diagram of FIG. 9 it can be seen that the base station 100 is optionally configured to receive a Switch Off Ongoing and/or Cell Deactivated indication.

With reference to the block diagram of FIG. 10 it can be seen that the base station 200 is optionally configured to send a Switch Off Ongoing and/or Cell Deactivated indication.

The functions described above may be implemented in hardware using any conventional hardware technology such as Integrated Circuit (IC) technology, including the possibility of using basic circuitry of the base station for providing radio coverage and handling neighbour cell relations, and general base station hardware for receiving and sending control messages. Alternatively, at least some of the functions may be implemented in software for execution on suitable processing hardware such as a microprocessor or digital signal processor, including the possibility of using the general processing capabilities of the base station.

Figure 12:
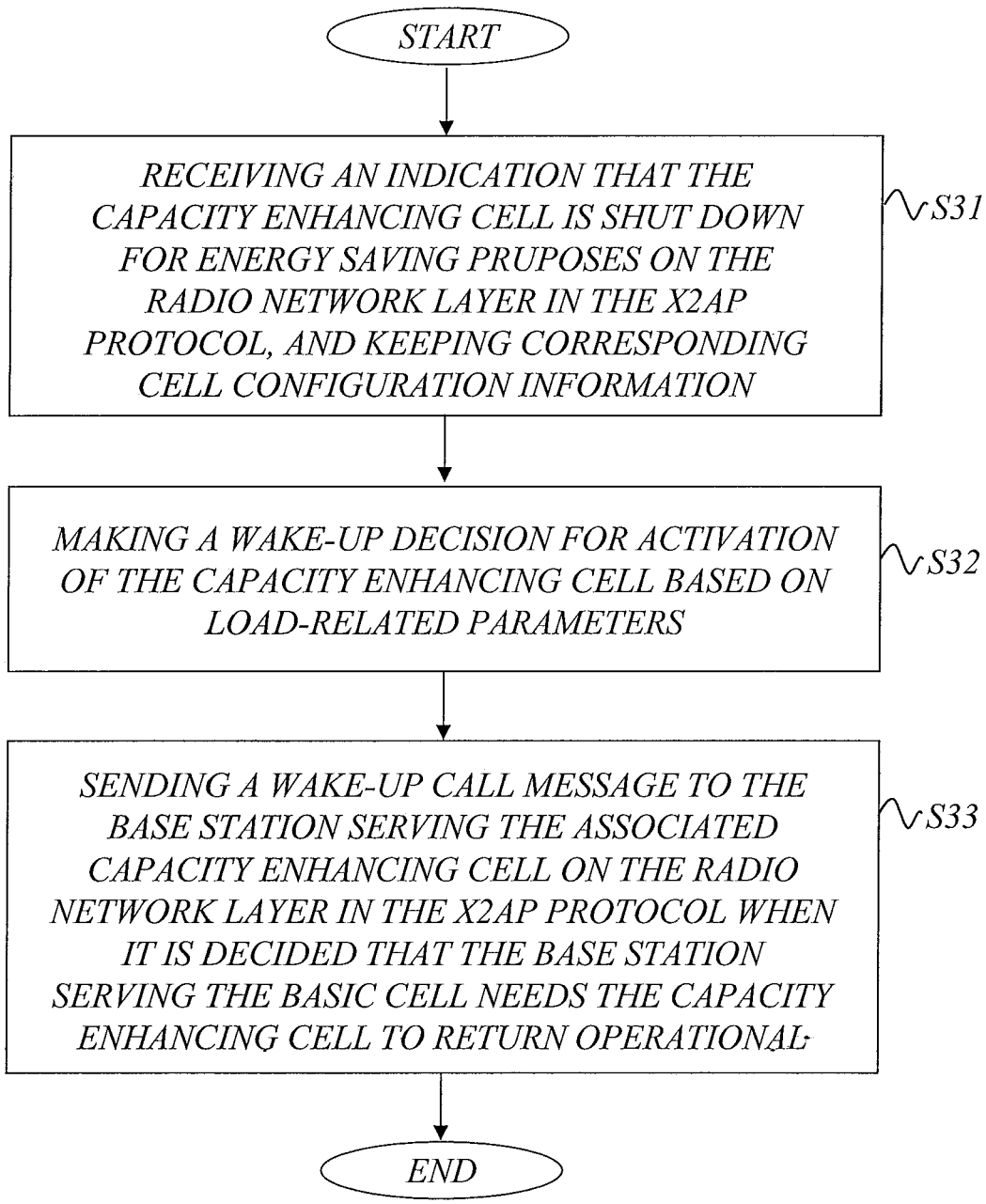
FIG. 12 is a schematic flow diagram of another example of a method for a base station serving a basic cell providing basic radio coverage.

FIG. 12 is a schematic flow diagram of another example of a method for a base station serving a basic cell providing basic radio coverage. In step S31, the base station receives an indication that the capacity enhancing cell is shut down for energy saving purposes on the radio network layer in the X2AP protocol, and the base station keeps the corresponding cell configuration information of the capacity enhancing cell. In step S32, the base station makes a wake-up decision for activation of the capacity enhancing cell based on load-related parameters. In step S33, the base station sends a wake-up call message to the base station serving the capacity enhancing cell on the radio network layer in the X2AP protocol when it is decided that the base station serving the basic cell needs the capacity enhancing cell to return operational.

Figure 13:
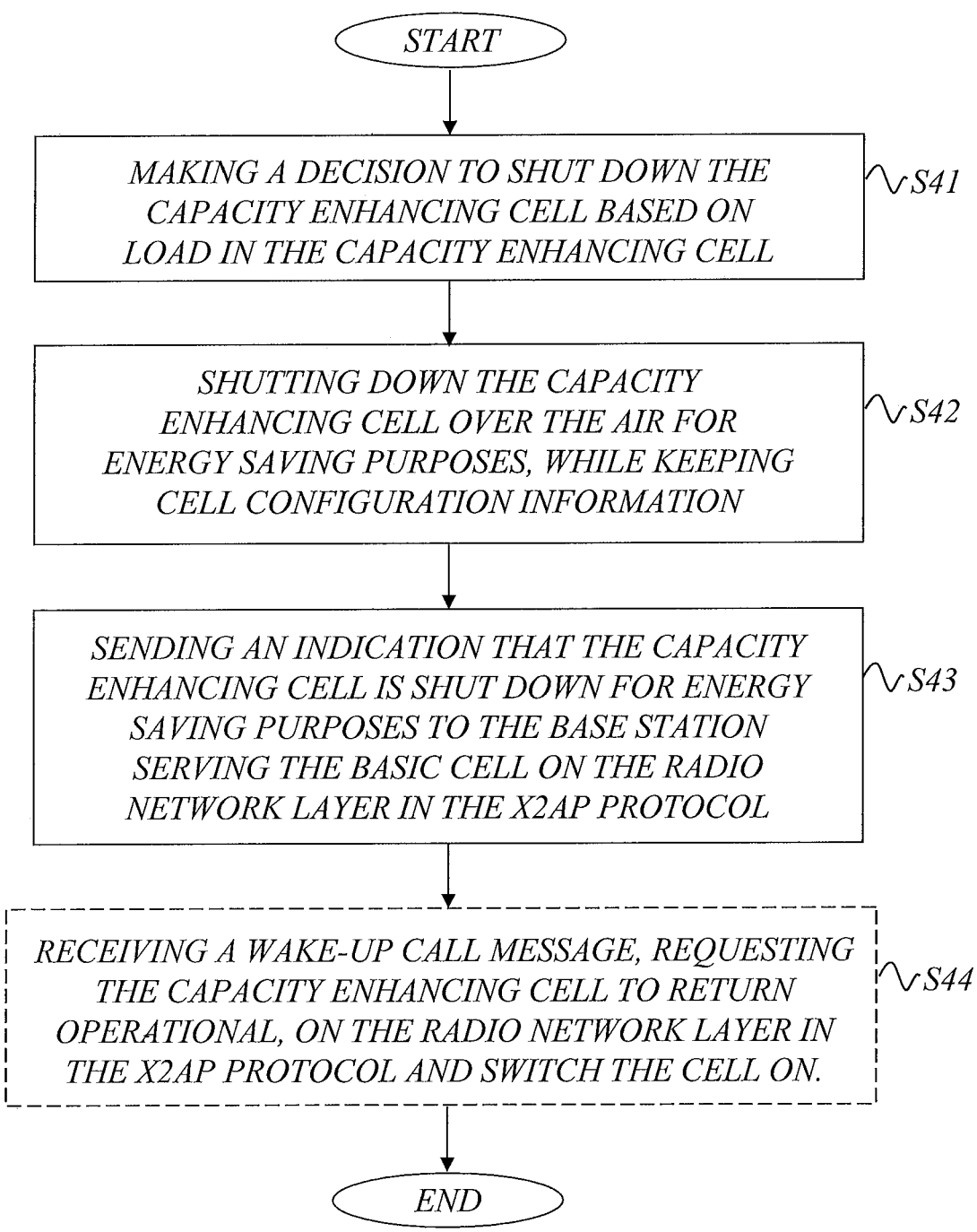
FIG. 13 is a schematic flow diagram of another example of method for a base station serving a capacity enhancing cell.

FIG. 13 is a schematic flow diagram of another example of method for a base station serving a capacity enhancing cell. In step S41, the base station makes a decision to shut down the capacity enhancing cell based on load in the capacity enhancing cell. In step S42, the base station shuts down the capacity enhancing cell over the air for energy saving purposes, while keeping the corresponding cell configuration information. In step S43, the base station sends an indication that the capacity enhancing cell is shut down for energy saving purposes to the base station serving the basic cell on the radio network layer in the X2AP protocol. Optionally, in step S44, the base station may subsequently receive a wake-up call message, requesting the capacity enhancing cell to return operational, on the radio network layer in the X2AP protocol and switch the capacity enhancing cell on based on the wake-up call message.

Figure 14:
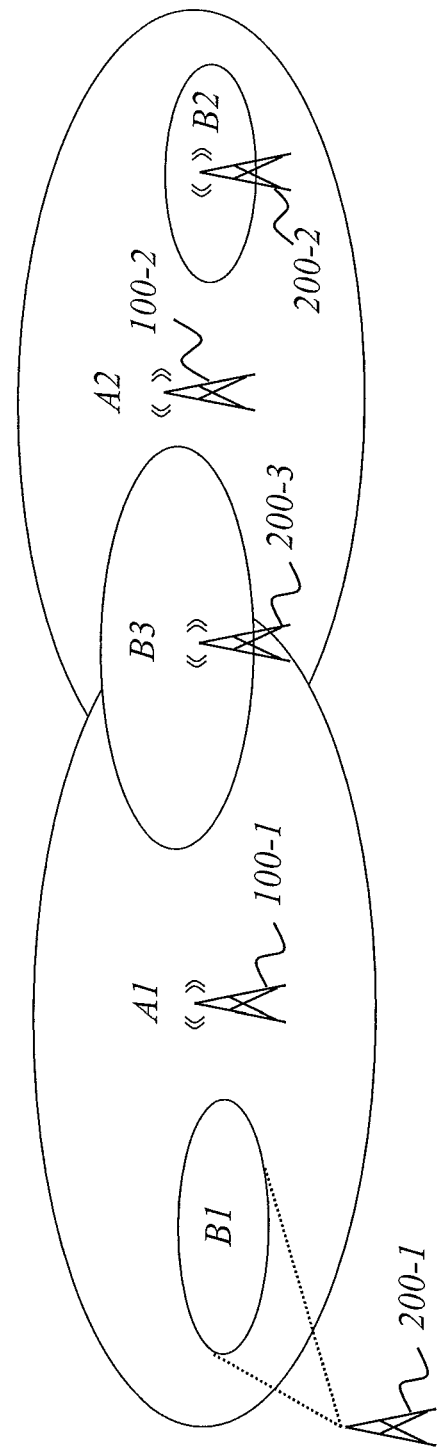
FIG. 14 is a schematic diagram illustrating an example of a scenario with base stations serving different types of cells.

FIG. 14 is a schematic diagram illustrating an example of a scenario with base stations serving different types of cells. In this particular example, two radio base stations 100-1 and 100-2 serving basic cells A1 and A2, respectively, are shown. Three base stations 200-1, 200-2 and 200-3 serving capacity enhancing cells B1, B2 and B3, respectively, are also shown. Different types of antenna arrangements including both omni-directional and directional antenna configurations may be used. In the example illustrated in FIG. 14, the basic cells A1 and A2 provide basic or wide coverage, and the capacity enhancing cells B1, B2 and B3 may be used for capacity enhancements in smaller regions. The basic cells A1 and A2 are partly overlapping, and the capacity enhancing cell B3 covers a smaller part of basic cell A1 as well as a smaller part of basic cell A2. The capacity enhancing cell B1 covers a smaller region within the basic cell A1 and capacity enhancing cell B2 covers a smaller region within the basic cell A2. Naturally, an infinite number of different cell configurations are feasible within the scope of the present invention.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

ABBREVIATIONS

E-UTRAN Evolved Universal Terrestrial Radio Access Network
HCS Hierarchical Cell Structure
IC Integrated Circuit
LTE Long Term Evolution
LTE-A LTE Advanced
O&M Operation & Maintenance
RAT Radio Access Technology
RNL Radio Network Layer
RRC Radio Resource Control
SCTP Stream Control Transmission Protocol
TNL Transport Network Layer
UE User Equipment
UMTS Universal Mobile Telecommunications System
WCDMA Wideband Code Division Multiple Access
X2AP X2 Application Protocol
3GPP 3rd Generation Partnership Project

REFERENCES

[1] 3GPP TS 36.423
[2] 3GPP TS 36.300

What is claimed is:

1. A method of operating a first base station serving a basic cell providing basic radio coverage, said basic cell having a neighbour cell relation to an associated capacity enhancing cell served by a second base station different from the first base station, wherein the basic cell and the capacity enhancing cell are different cells, said method performed by the first base station and comprising:
receiving an indication on the Radio Network Layer (RNL) in the X2 Application Protocol (X2AP) that the associated capacity enhancing cell is shut off over the air for energy saving purposes, and keeping corresponding cell configuration information of the capacity enhancing cell, the cell configuration information indicating an operational configuration of the capacity enhancing cell before the capacity enhancing cell is shut off, wherein when shut off the capacity enhancing cell does not provide radio coverage and does not provide radio signal transmissions, and wherein the second base station serving the capacity enhancing cell remains on when the capacity enhancing cell is shut off; and
sending a wake-up call message on the Radio Network Layer (RNL) in the X2 Application Protocol (X2AP) to the second base station serving the associated capacity enhancing cell when it is decided that the first base station serving the basic cell needs the capacity enhancing cell to return operational, the wake-up call message indicating the operational configuration of the capacity enhancing cell kept by the first base station, the operational configuration to be utilized by the capacity enhancing cell for its cell configuration when it returns to operational responsive to receiving the wake-up call message.

2. The method of claim 1, wherein the first base station serving the basic cell indicates that it needs the capacity enhancing cell to return operational via said wake-up call message in the X2AP protocol.

3. The method of claim 2, wherein said wake-up call message is a Cell Activation Request.

4. The method of claim 1, wherein said indication is received in the eNB Configuration Update procedure of the X2AP protocol.

5. The method of claim 4, wherein the reason for the shut-off as an action due to energy-saving purposes is indicated in the eNB Configuration Update procedure.

6. The method of claim 1, further comprising determining to activate the capacity enhancing cell based on load-related parameters of the basic cell.

7. The method of claim 6, wherein said load-related parameters of the basic cell comprise statistics on at least one of load in the basic cell and load balancing actions the basic cell triggers towards the capacity enhancing cell.

8. The method of claim 1, wherein the basic cell and the capacity enhancing cell represent different types of cells in a heterogeneous radio communication network.

9. The method of claim 8, wherein the heterogeneous radio communication network has a Hierarchical Cell Structure (HCS), and the basic cell is a cell on a lower HCS layer and the capacity enhancing cell is a cell on a higher HCS layer.

10. The method of claim 1, wherein the first base station serving the basic cell and the second base station serving the associated capacity enhancing cell are radio network elements of different radio access technologies.

11. A first base station having a radio coverage unit configured to serve a basic cell providing basic radio coverage, and a neighbour cell relation unit configured to manage a neighbour cell relation between said basic cell and an associated capacity enhancing cell served by a second base station different from the first base station, wherein the basic cell and the capacity enhancing cell are different cells, wherein said first base station comprises:
a cell configuration information unit configured to receive an indication, on the Radio Network Layer (RNL) in the X2 Application Protocol (X2AP), that the associated capacity enhancing cell is shut down over the air for energy saving purposes, and to keep corresponding cell configuration information of the capacity enhancing cell, the cell configuration information indicating an operational configuration of the capacity enhancing cell before the capacity enhancing cell is shut off, wherein when shut down the capacity enhancing cell does not provide radio coverage and does not provide radio signal transmissions, and wherein the second base station serving the capacity enhancing cell remains on when the capacity enhancing cell is shut down; and
a wake-up call unit configured to send a wake-up call message, on the Radio Network Layer (RNL) in the X2 Application Protocol (X2AP), to the second base station serving the associated capacity enhancing cell when it is decided that the first base station serving the basic cell needs the capacity enhancing cell to return operational, the wake-up call message indicating the operational configuration of the capacity enhancing cell kept by the first base station, the operational configuration to be utilized by the capacity enhancing cell for its cell configuration when it becomes operational responsive to receiving the wake-up call message.

12. The first base station of claim 11, wherein said wake-up call unit is configured to indicate that it needs the capacity enhancing cell to return operational via said wake-up call message in the X2AP protocol.

13. The first base station of claim 12, wherein said wake-up call message is a Cell Activation Request.

14. The first base station of claim 11, wherein said cell configuration information unit is configured to receive said indication in the eNB Configuration Update procedure of the X2AP protocol.

15. The first base station of claim 14, wherein said first base station is configured to receive an indication of the reason for shut-down as an action due to energy-saving purposes in the eNB Configuration Update procedure.

16. The first base station of claim 11, wherein said a wake-up call unit comprises a wake-up decision unit configured to determine to activate the capacity-enhancing cell based on load-related parameters of the basic cell.

17. The first base station of claim 16, wherein said load-related parameters of the basic cell comprise statistics on at least one of load in the basic cell and load balancing actions the basic cell triggers towards the capacity enhancing cell.

18. The first base station of claim 11, wherein the basic cell and the capacity enhancing cell represent different types of cells in a heterogeneous radio communication network.

19. The first base station of claim 18, wherein the heterogeneous radio communication network has a Hierarchical Cell Structure (HCS), and the basic cell is a cell on a lower HCS layer and the capacity enhancing cell is a cell on a higher HCS layer.

20. The first base station of claim 11, wherein the first base station serving the basic cell and the second base station serving the associated capacity enhancing cell are radio network elements of different radio access technologies.

21. The method of claim 1, further comprising receiving an indication from the second base station, said indication indicating that handover of user equipment is performed from the capacity enhancing cell because the capacity enhancing cell is going to be switched off.

22. The method of claim 1, further comprising receiving an indication from the second base station, said indication indicating that handover of user equipment to the capacity enhancing cell has failed because the capacity enhancing cell is shut off.

23. The first base station of claim 11, wherein said first base station is further configured to receive an indication from the second base station, said indication indicating that handover of user equipment is performed from the capacity enhancing cell because the capacity enhancing cell is going to be switched off.

24. The first base station of claim 11, wherein said first base station is further configured to receive an indication from the second base station, said indication indicating that handover of user equipment to the capacity enhancing cell has failed because the capacity enhancing cell is off.

25. A method of operating a first base station serving a capacity enhancing cell, said capacity enhancing cell having a neighbour cell relation to an associated basic cell, providing basic radio coverage and served by a second base station different from the first base station, wherein the basic cell and the capacity enhancing cell are different cells, said method performed by the first base station and comprising:
   shutting down the capacity enhancing cell over the air for energy saving purposes, while the first base station remains on and keeps cell configuration information, wherein when shut down the capacity enhancing cell does not provide radio coverage and does not provide radio signal transmissions;
   sending an indication on the Radio Network Layer (RNL) in the X2 Application Protocol (X2AP) that the capacity enhancing cell is shut down for energy saving purposes to the second base station serving the basic cell, said indication enabling the second base station serving the basic cell to keep the cell configuration information of the capacity enhancing cell, the cell configuration information indicating an operational configuration of the capacity enhancing cell before the capacity enhancing cell is shut off;
   receiving a wake-up call message on the Radio Network Layer (RNL) in the X2 Application Protocol (X2AP) from the second base station serving the basic cell requesting the capacity enhancing cell to return operational, the wake-up call message indicating the operational configuration of the capacity enhancing cell kept by the second base station;
   switching on the capacity enhancing cell based on the wake-up call message; and
   configuring the switched-on capacity enhancing cell with the operational configuration.

26. The method of claim 25, wherein shut-down of the capacity enhancing cell is indicated in the eNB Configuration Update procedure of the X2AP protocol.

27. The method of claim 26, wherein the reason for shut-down as an action due to energy-saving purposes is indicated in the eNB Configuration Update procedure.

28. The method of claim 25, wherein said step of shutting down the cell is self-triggered, and the first base station serving the capacity enhancing cell is making a decision to shut down the capacity enhancing cell based on load in the capacity enhancing cell.

29. The method of claim 25, wherein the basic cell and the capacity enhancing cell represent different types of cells in a heterogeneous radio communication network.

30. The method of claim 29, wherein the heterogeneous radio communication network has a Hierarchical Cell Structure (HCS), and the basic cell is a cell on a lower HCS layer and the capacity enhancing cell is a cell on a higher HCS layer.

31. The method of claim 25, further comprising the step of the first base station serving the capacity enhancing cell sending an indication to the second base station serving the basic cell, said indication indicating that handover of user equipment is performed from the capacity enhancing cell because the capacity enhancing cell is going to be switched off.

32. The method of claim 25, further comprising the step of the first base station serving the capacity enhancing cell sending an indication to the second base station serving the basic cell, said indication indicating that handover of user equipment to the capacity enhancing cell has failed because the capacity enhancing cell is off.

33. A first base station having a radio coverage unit configured to serve a capacity enhancing cell, and a neighbour cell relation unit configured to manage a neighbour cell relation between said capacity enhancing cell and an associated basic cell, providing basic radio coverage and served by a second base station different from the first base station, wherein the basic cell and the capacity enhancing cell are different cells, wherein said first base station comprises:
   a shut-down unit configured to shut down the capacity enhancing cell over the air for energy saving purposes, wherein when shut down the capacity enhancing cell does not provide radio coverage and does not provide radio signal transmissions, and wherein the first base station serving the capacity enhancing cell remains on when the capacity enhancing cell is shut down; and
   a cell configuration information unit configured to keep corresponding cell configuration information;
   wherein said shut-down unit is configured to send an indication, on the Radio Network Layer (RNL) in the X2 Application Protocol (X2AP), that the capacity enhancing cell is shut down for energy saving purposes to the second base station serving the basic cell, said indication enabling the second base station serving the basic cell to keep the cell configuration information of the capacity enhancing cell, the cell configuration information indicating an operational configuration of the capacity enhancing cell before the capacity enhancing cell is shut off; and wherein the operational configuration is to be utilized for cell configuration of the capacity enhancing cell when the capacity enhancing cell returns to operational.

34. The first base station of claim 33, wherein said shut-down unit is configured to indicate shut-down of the capacity enhancing cell in the eNB Configuration Update procedure of the X2AP protocol.

35. The first base station of claim 34, wherein said shut-down unit is configured to indicate the reason for shut-down as an action due to energy-saving purposes in the eNB Configuration Update procedure.

36. The first base station of claim 33, wherein said shut-down unit is configured to make a decision to shut down the capacity enhancing cell based on load in the capacity enhancing cell.

37. The first base station of claim 33, wherein said first base station comprises a switch-on unit configured to receive a wake-up call message from the second base station serving the basic cell requesting the capacity enhancing cell to return operational, and to switch the capacity enhancing cell on based on the wake-up call message.

38. The first base station of claim 33, wherein said first base station is further configured to send an indication to the second base station serving the basic cell, said indication indicating that handover of user equipment is performed from the capacity enhancing cell because the capacity enhancing cell is going to be switched off.

39. The first base station of claim 33, wherein said first base station is further configured to send an indication to the second base station serving the basic cell, said indication indicating that handover of user equipment to the capacity enhancing cell has failed because the capacity enhancing cell is off.

40. The first base station of of claim 33, wherein the basic cell and the capacity enhancing cell represent different types of cells in a heterogeneous radio communication network.

41. The first base station of claim 40, wherein the heterogeneous radio communication network has a Hierarchical Cell Structure (HCS), and the basic cell is a cell on a lower HCS layer and the capacity enhancing cell is a cell on a higher HCS layer.

42. The method of claim 1, wherein the cell configuration information comprises an indication that the capacity enhancing cell is deactivated.

43. A method for at least one of adding and removing a cell from operation in a heterogeneous radio communication network having at least two different types of cells, including a first type of basic cell for providing basic radio coverage served by a first base station and a second type of cell associated to a basic cell as a capacity enhancing cell served by a second base station different from the first base station, wherein the basic cell and the capacity enhancing cell are different cells, said method comprising:

selectively switching the capacity enhancing cell on and off, wherein when the capacity enhancing cell is shut off, the capacity enhancing cell keeps cell configuration information but does not provide radio coverage and does not provide radio signal transmissions, wherein the cell configuration information indicates an operational configuration of the capacity enhancing cell before the capacity enhancing cell is shut off, and wherein the second base station serving the capacity enhancing cell remains on when the capacity enhancing cell is shut off;

receiving, at the first base station serving the basic cell, an indication from the second base station serving the capacity enhancing cell, said indication indicating that the capacity enhancing cell is shut off;

keeping, at the first base station serving the basic cell, the cell configuration information of the shut off capacity enhancing cell; and sending, by the first base station serving the basic cell, a wake-up call message to the second base station serving the capacity enhancing cell to switch on the capacity enhancing cell, the wake-up call message indicating the operational configuration of the capacity enhancing cell kept by the first base station, the operational configuration is to be utilized for cell configuration of the capacity enhancing cell when the capacity enhancing cell returns to operational responsive to the second base station receiving the wake-up call message.

\* \* \* \* \*

UNITED STATES PATENT AND TRADEMARK OFFICE
CERTIFICATE OF CORRECTION

PATENT NO. : 11,218,960 B2
APPLICATION NO. : 14/547945
DATED : January 4, 2022
INVENTOR(S) : Myhre et al.

Page 1 of 2

It is certified that error appears in the above-identified patent and that said Letters Patent is hereby corrected as shown below:

On the Title Page

Item (63), under "Related U.S. Application Data", in Column 1, Line 2, delete "2010." and insert -- 2010, now Abandoned. --, therefor.

In the Drawings

In Fig. 12, Sheet 12 of 14, for Step "S31", in Line 3, delete "PRUPOSES" and insert -- PURPOSES --, therefor.

In the Specification

In Column 1, Line 8, delete "2010," and insert -- 2010, now Abandoned, --, therefor.

In Column 6, Line 36, delete "in average" and insert -- on average --, therefor.

In Column 10, Lines 42-43, delete "General Service Availability is not Compromised while Energy Consumption in the System is reduced;" and insert -- General service availability is not compromised while energy consumption in the system is reduced; --, therefor.

In Column 10, Line 50, delete "way." and insert -- way; --, therefor.

In Column 13, Line 1, delete "cell on based on" and insert -- cell based on --, therefor.

In Column 13, Line 35, delete "off" and insert -- off. --, therefor.

In Column 13, Line 49, delete "cell is off." and insert -- cell is shut off. --, therefor.

In Column 13, Line 54, delete "cell is off." and insert -- cell is shut off. --, therefor.

Signed and Sealed this
Nineteenth Day of July, 2022

Katherine Kelly Vidal
*Director of the United States Patent and Trademark Office*

CERTIFICATE OF CORRECTION (continued)
U.S. Pat. No. 11,218,960 B2

In Column 14, Line 39, delete "cell on based on" and insert -- cell based on --, therefor.

In the Claims

In Column 17, Line 46, in Claim 24, delete "cell is off." and insert -- cell is shut off. --, therefor.

In Column 18, Line 45, in Claim 32, delete "cell is off." and insert -- cell is shut off. --, therefor.

In Column 19, Lines 26-27, in Claim 37, delete "cell on based on" and insert -- cell based on --, therefor.

In Column 19, Line 39, in Claim 39, delete "cell is off." and insert -- cell is shut off. --, therefor.

In Column 19, Line 40, in Claim 40, delete "of of" and insert -- of --, therefor.